US009205573B2

(12) United States Patent
George et al.

(10) Patent No.: US 9,205,573 B2
(45) Date of Patent: Dec. 8, 2015

(54) RECYCLING OF BROAD GOODS WITH THERMOPLASTIC STABILIZER MATERIALS

(71) Applicant: The Boeing Company, Seal Beach, CA (US)

(72) Inventors: Panagiotis Emanuel George, Lake Tapps, WA (US); Kelsi M Hurley, Seattle, WA (US); Erika L Carter, Seattle, WA (US); William L Carberry, Woodinville, WA (US)

(73) Assignee: THE BOEING COMPANY, Chicago, IL (US)

(*) Notice: Subject to any disclaimer, the term of this patent is extended or adjusted under 35 U.S.C. 154(b) by 175 days.

(21) Appl. No.: 13/860,399

(22) Filed: Apr. 10, 2013

(65) Prior Publication Data

US 2014/0308519 A1    Oct. 16, 2014

(51) Int. Cl.
| | |
|---|---|
| *B29B 9/14* | (2006.01) |
| *B29B 17/04* | (2006.01) |
| *B29B 17/00* | (2006.01) |
| *C08J 11/00* | (2006.01) |
| *B29K 105/08* | (2006.01) |
| *B29B 9/02* | (2006.01) |
| *B29B 9/06* | (2006.01) |
| *B29K 101/12* | (2006.01) |
| *B29K 105/12* | (2006.01) |

(52) U.S. Cl.
CPC ............ *B29B 17/0412* (2013.01); *B29B 9/14* (2013.01); *B29B 17/0026* (2013.01); *B29B 17/0036* (2013.01); *C08J 11/00* (2013.01); *B29B 9/02* (2013.01); *B29B 9/06* (2013.01); *B29K 2101/12* (2013.01); *B29K 2105/0863* (2013.01); *B29K 2105/12* (2013.01); *Y02W 30/62* (2015.05); *Y02W 30/625* (2015.05); *Y10T 428/2982* (2015.01)

(58) Field of Classification Search
None
See application file for complete search history.

(56) References Cited

U.S. PATENT DOCUMENTS

| 5,230,944 | A | | 7/1993 | Beer et al. |
|---|---|---|---|---|
| 5,401,567 | A | * | 3/1995 | Knobloch .................... 442/415 |
| 5,591,384 | A | * | 1/1997 | Abrams et al. ............... 264/40.5 |
| 5,660,770 | A | * | 8/1997 | Wernicke et al. .......... 264/37.28 |

(Continued)

FOREIGN PATENT DOCUMENTS

| DE | 10149368 | 4/2003 |
|---|---|---|
| DE | 102010008349 | 8/2011 |

(Continued)

OTHER PUBLICATIONS

TFP Global "Thermoplastic Veils and Mats;" downloaded from http://www.tfpglobal.com/materials/thermoplastic/ on Jan. 23, 2013.

(Continued)

*Primary Examiner* — Mary F Theisen
(74) *Attorney, Agent, or Firm* — Parsons Behle & Latimer

(57) ABSTRACT

A method is disclosed for recycling broad goods material into a flaked feed material. The broad goods material includes reinforcement fibers and thermoplastic material. The recycling method includes applying heat and pressure to impregnate the reinforcement fibers at a filament level with the thermoplastic material to form an impregnated fiber material. The method also includes cooling the impregnated fiber material, and cutting the cooled impregnated fiber material into flakes to produce the flaked feed material.

10 Claims, 3 Drawing Sheets

(56) References Cited

U.S. PATENT DOCUMENTS

| | | |
|---|---|---|
| 5,959,031 A | 9/1999 | Thurgood |
| 6,271,270 B1 | 8/2001 | Muzzy et al. |
| 6,537,341 B2 | 3/2003 | Dannenhauer et al. |
| 7,435,693 B2 | 10/2008 | Tsotsis et al. |
| 7,514,026 B1 * | 4/2009 | Zafiroglu ............... 264/112 |
| 8,273,450 B2 | 9/2012 | Green |
| 2006/0252334 A1 | 11/2006 | LoFaro et al. |
| 2009/0226712 A1 | 9/2009 | Handa et al. |
| 2010/0152353 A1 | 6/2010 | Kuan |
| 2010/0154992 A1 | 6/2010 | Feinstein et al. |
| 2010/0189629 A1 | 7/2010 | Price et al. |
| 2010/0261014 A1 | 10/2010 | Geiger, Jr. |
| 2011/0036481 A1 * | 2/2011 | Inserra Imparato et al. .... 156/94 |
| 2011/0057341 A1 * | 3/2011 | Meier ................ 264/37.28 |
| 2013/0196154 A1 * | 8/2013 | Ortlepp et al. ............ 428/357 |

FOREIGN PATENT DOCUMENTS

| | | |
|---|---|---|
| EP | 2233517 | 9/2010 |
| WO | 0132405 | 5/2001 |

OTHER PUBLICATIONS

European Patent Office, European Search Report for EP14160604.6 dated Jun. 27, 2014.

European Patent Office; Examination Report issued in EP Application No. 14160604.6 dated May 21, 2015.

* cited by examiner

RECYCLING OF BROAD GOODS WITH THERMOPLASTIC STABILIZER MATERIALS

BACKGROUND

The present application relates in general to the recycling of scrap broad goods and, in particular, to the recycling of scrap broad goods containing thermoplastic stabilizer materials.

Broad goods may include a wide variety of fabrics and other materials having a plurality of individual fibers or filaments bundled together to form a tow, or "flattened" (rather than twisted) yarn. For example, in some cases, a tow may include a bundle of 3,000, 6,000, 12,000 or 24,000 fibers or filaments, depending on the desired application. A plurality of tows, in turn, are frequently woven together to form a sheet of reinforcement fibers.

One example category of broad goods are fiber-reinforced resin matrix composites, such as carbon fiber or fiberglass, which may be used in a variety of applications, including aircraft manufacturing. In some cases, such fiber-reinforced resin matrix composites are formed by arranging and securing dry structural reinforcement fibers (as a fabric or a unidirectional material) in a mold, injecting or infusing resin matrix into the mold, and curing the resin matrix to harden the composite. The dry fibers can be secured in position by stitching, stapling or weaving a thermoplastic into the reinforcement fibers, or interlayering a thermoplastic veil or scrim between layers of fibers. When thermoplastic is added to the fibers (by, for example, electrospinning the veil or scrim to a sheet of fiber), it stabilizes the position of the fibers at the tow level for the resin impregnation and curing process.

During the manufacture of a given composite part, desired pieces, such as ply cutouts, are frequently cut from one or more full sheets of fabric, leaving behind scrap pieces that cannot be used because they may be too small or of the wrong dimensions and fiber orientations for a new ply. Even so, the scrap pieces of composite material often include valuable reinforcement fibers that cannot be used in the finished part. However, the use of thermoplastic veils or scrims increases the difficulty of reclaiming and recycling the reinforcement fibers in the scrap fabric to the point that thermoplastic-containing reinforcement fibers are often discarded rather than being recycled. For example, when the scrap material is cut into pieces, individual fibers frequently tend to pull away from the tows in the fabric. As a result, large scrap fabric pieces tend to fray around the edges, and small scrap fabric pieces tend to fall apart into individual fibers. Attempting to remove the thermoplastic from the fibers is generally not time or cost effective.

Even when thermoplastics are not used, recycled dry reinforcement fibers are often used only in low-value applications because the alignment and structure of the fibers is lost. For example, dry reinforcement fibers may be recycled into random fiber injection molding compounds or milled into very short fiber reinforcements.

SUMMARY

The present application discloses various systems and methods to address the aforementioned challenges with existing recycling solutions.

In one example, a method is disclosed for recycling broad goods material into a flaked feed material. The broad goods material includes reinforcement fibers and thermoplastic material. The method comprises applying heat and pressure to the broad goods material to impregnate the reinforcement fibers at a filament level with the thermoplastic material to form an impregnated fiber material. The method further comprises cooling the impregnated fiber material, and cutting the cooled impregnated fiber material into flakes to produce the flaked feed material.

The broad goods material may comprise a fiber-reinforced resin-matrix composite material. Impregnating the reinforcement fibers at a filament level may comprise embedding the thermoplastic material between filaments of the reinforcement fibers. Applying heat may comprise heating by infrared, conduction or convection heating. Cutting the cooled impregnated fiber material may comprise slitting or chopping. The method may further comprise adding the thermoplastic material to dry fibers. The method may further comprise classifying the flakes to create substantially uniform flaked feed material output. The method may further comprise compounding the flaked feed material to create a thermoplastic or thermoset molding compound. The method may further comprise mixing the flaked feed material with a thermoset resin to create a bulk molding compound. The method may further comprise sprinkling the flaked feed material onto a moving doctored resin film on a carrier, and impregnating the flaked feed material into the doctored resin film by application of heat and pressure, to create a sheet molding compound.

In another example, a system comprises an accumulator configured to collect broad goods material including reinforcement fibers and thermoplastic material. The system further comprises a consolidator in communication with the accumulator and configured to impregnate the thermoplastic material into the reinforcement fibers of the broad goods material at a filament level to form an impregnated fiber material. The system further comprises a chopper in communication with the consolidator and configured to cut the impregnated fiber material into substantially uniform flakes;

The system may further comprise a powdered binder applicator, a liquid binder applicator, or a film binder applicator in communication with the accumulator and configured to apply a thermoplastic binder to the broad goods material. The system may further comprise a combiner in communication with the chopper and configured to combine the flakes of impregnated fiber material with one or more added compounding materials to create a thermoplastic or thermoset molding compound. The added compounding material(s) may comprise polyamide, polyester, polyethylene, polyprolylene, polyetherimide (PEI), polyphenylene (PPS), polyetheretherketone (PEEK), or polyetherketoneketone (PEKK). The system may further comprise an extruder configured to extrude pellets of the thermoplastic or thermoset molding compound.

In another example, a recycled feed material comprises a plurality of substantially uniform flakes of recycled broad goods material. The broad goods material has a plurality of individual filaments bundled together to form a tow. Each flake comprises a plurality of reinforcement fibers and a thermoplastic material impregnated within the reinforcement fibers at a filament level.

Each flake of recycled broad goods material may have a maximum dimension of about 1 inch or less. The broad goods material may comprise a fiber-reinforced resin-matrix composite material. The flakes may comprise squares, rectangles, triangles, parallelograms, or circles. The thermoplastic may comprise polyamide, polyester, polyethylene, polyprolylene, polyetherimide (PEI), polyphenylene (PPS), polyetheretherketone (PEEK), or polyetherketoneketone (PEKK).

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

Figure 1:
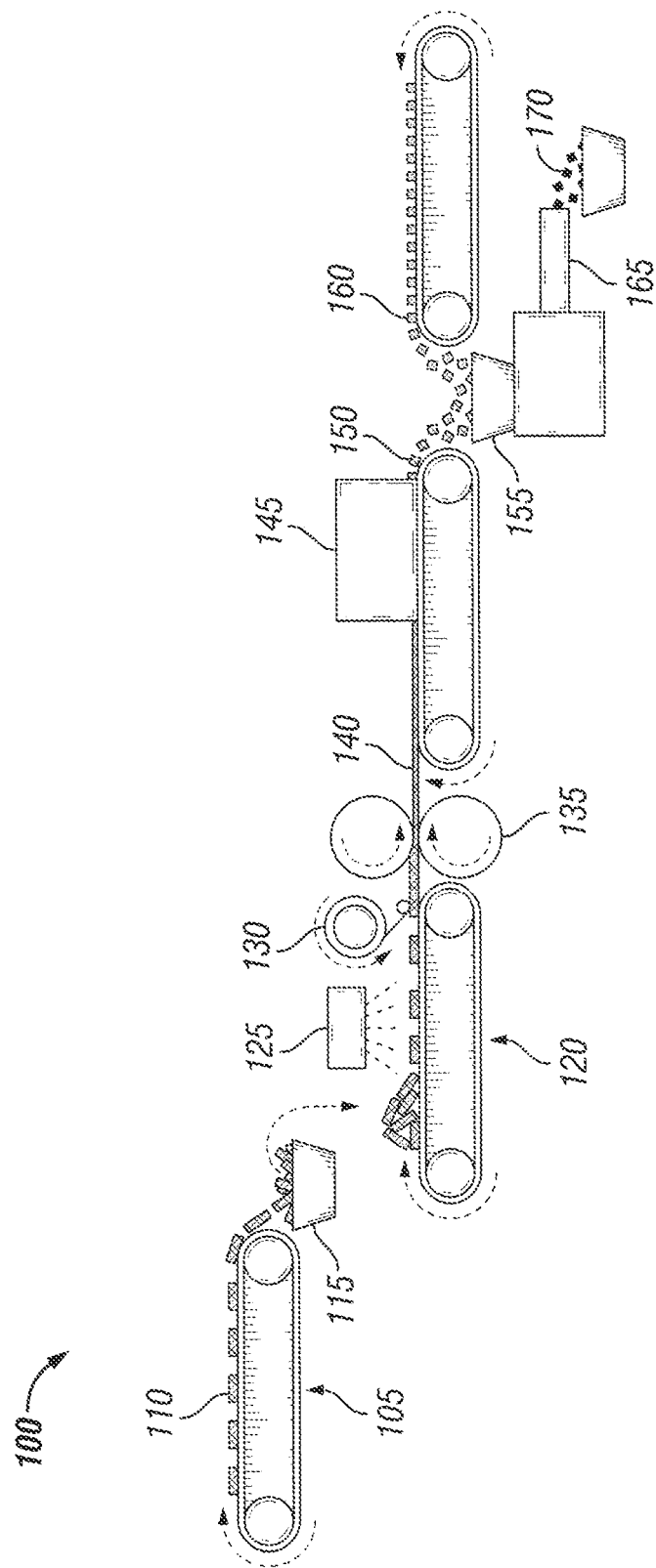
FIG. 1 illustrates one example of a recycling system suitable for recycling scrap broad goods having thermoplastic stabilizer materials.

FIG. 1 illustrates one example of a recycling system 100 suitable for recycling scrap broad goods having thermoplastic stabilizer materials, in accordance with the present application. The scrap broad goods may have been discarded during a previous process step, such as an aircraft manufacturing process.

In the example illustrated in FIG. 1, the system 100 comprises an accumulator 105 configured to collect scrap material 110 in a collector 115. Although the accumulator 105 is shown as a conveyor belt in the illustrated example, the accumulator 105 may comprise a wide variety of other suitable components, such as, for example, chutes, sorters, robotic mechanisms, etc. In addition, although the scrap material 110 is shown as numerous discrete pieces being collected in a basket or bin, in other examples, the scrap material 110 may be a single sheet of material, and the collector 115 may comprise a roll onto which the sheet of scrap material 110 is rolled.

The scrap material 110 may comprise any suitable broad goods that are desired to be recycled. As discussed above, broad goods may include a wide variety of fabrics or other materials having a plurality of individual fibers or filaments bundled together to form tows. In many cases, the scrap material 110 may include a thermoplastic stabilizer material, such as a veil or a scrim, to stabilize the tows. The thermoplastic stabilizer material may comprise any suitable thermoplastic, such as, for example, polyamide, polyester, polyethylene, polyprolylene, polyetherimide (PEI), polyphenylene (PPS), polyetheretherketone (PEEK), or polyetherketoneketone (PEKK). In some cases, the scrap material 110 comprises a fiber-reinforced resin matrix composite, such as carbon fiber or fiberglass, with a nylon veil.

Referring again to FIG. 1, the output of the accumulator 105 is fed into an optional applier 120 comprising an optional powdered and/or liquid binder applicator 125 and/or an optional film binder applicator 130. The powdered and/or liquid binder applicator 125 may comprise any suitable apparatus for applying a powdered thermoplastic binder agent and/or a liquid thermosetting binder agent to the scrap material 110, if desired. For example, in some cases, the powdered and/or liquid binder applicator 125 may comprise a tumble blender, a sifter liquid curtain applicator, and/or a powder curtain applicator. In addition, the film binder applicator 130 may comprise any suitable apparatus for applying a thermoplastic binding film, such as a thermoplastic veil or scrim, to the scrap material 110, if desired. For example, in some cases, the film binder applicator 130 may comprise a tension-controlled take-off roll. As noted above, the applier 120 is optional and may be omitted from the recycling system 100 entirely, especially in cases in which the scrap material 110 already includes a thermoplastic stabilizer material.

The optional applier 120 (if present) is in communication with a consolidator 135 configured to impregnate the scrap material with a thermoplastic, such as a veil or a scrim. In some cases, the consolidator 135 may comprise heated nip rollers, a calendaring machine, heated belts, an autoclave, or a hot press, among other examples. In operation, the consolidator 135 melts and impregnates the thermoplastic into the scrap material 110 at a filament level, meaning the thermoplastic penetrates between the individual filaments or fibers of the scrap material 110. Therefore, the output of the consolidator 135 comprises an impregnated scrap material 140 having filaments that are stable for subsequent processing.

In the example shown in FIG. 1, this impregnated scrap material 140 is fed into a chopper 145 configured to cut the impregnated scrap material 140 into substantially uniform particles or flakes 150. The chopper 145 may comprise, for example, one or more ply cutters, rotary slitters, rotary choppers, and/or guillotine choppers, including pairs of such devices for achieving certain desired flake shapes. The flakes 150 of impregnated scrap material 140 may comprise squares, rectangles, triangles, parallelograms, circles, or any other desired shapes. Because the impregnated scrap material 140 includes thermoplastic embedded at the filament level, the flakes 150 of impregnated scrap material 140 can advantageously be cut smaller than would otherwise be possible without the thermoplastic impregnated at the filament level. This characteristic advantageously allows the flakes 150 to be cut with a maximum dimension, or fiber length, that is sufficiently small to enable compounding. For example, in some cases, each flake 150 has a maximum fiber length of about one inch or less. At this size, the flakes 150 would fall apart during subsequent processing and handling if the thermoplastic and/or additional binders were not impregnated at the filament level.

The chopper 145 is in communication with an optional combiner 155 configured to combine the impregnated scrap material 140 with added compounding material(s) 160 (if desired) for compounding. The combiner 155 may comprise any suitable material mixer(s) or blender(s), such as, for example, one or more hoppers, metered screw feeders, and/or tumble blenders. The added compounding material(s) 160 may comprise, for example, thermoplastic pellets for compounding, pigments or colorants, or other additives for wear, flame retardance, or improvement of various other properties. In some cases, for example, the added compounding material(s) 160 may comprise polyamide, polyester, polyethylene, polyprolylene, polyetherimide (PEI), polyphenylene (PPS), polyetheretherketone (PEEK), or polyetherketoneketone (PEKK). The selected compounding material(s) 160 are often pre-mixed before being added to the combiner 155.

As shown in FIG. 1, the optional combiner 155 is in communication with an optional extruder 165 configured to perform the compounding process, if desired, on the combined flakes 150 of impregnated scrap material 140 and the added compounding material(s) 160. When the impregnated scrap material 140 is compounded, the flakes 150 generally remain together only until they go through the extruder 165, which creates molding compound pellets 170. The extruder 165 may comprise any suitable extrusion apparatus, such as, for example, a single screw extruder or twin screw extruder. The extruder 165 may be selected based on a variety of factors, such as the size of the flakes 150 and the particular thermoplastic used. The compounding process may create pellets 170 of any suitable thermoplastic molding compound, such as, for example, a recycled carbon fiber nylon molding compound. The molding compound pellets 170 may be used, in turn, to create molded parts using techniques that are well-known to those of skill in the art.

In an alternative example, the optional combiner 155 may comprise a hopper and feeder configured to feed the flakes 150 of impregnated scrap material 140 to a powdered solid and/or liquid thermoset resin (e.g., an epoxy, polyester, or cyanate ester) in either a batch process or a continuous process. In the case of a batch process, the flakes 150 and powdered solid and/or liquid thermoset resin may be added to a mixing chamber and mixed with or without applied heat, resulting in a bulk molding compound. In the case of a continuous process, the flakes 150 may be sprinkled onto a layer of resin film moving on a carrier, followed by application of heat and pressure to impregnate the flakes 150, resulting in a sheet molding compound.

Figure 2:
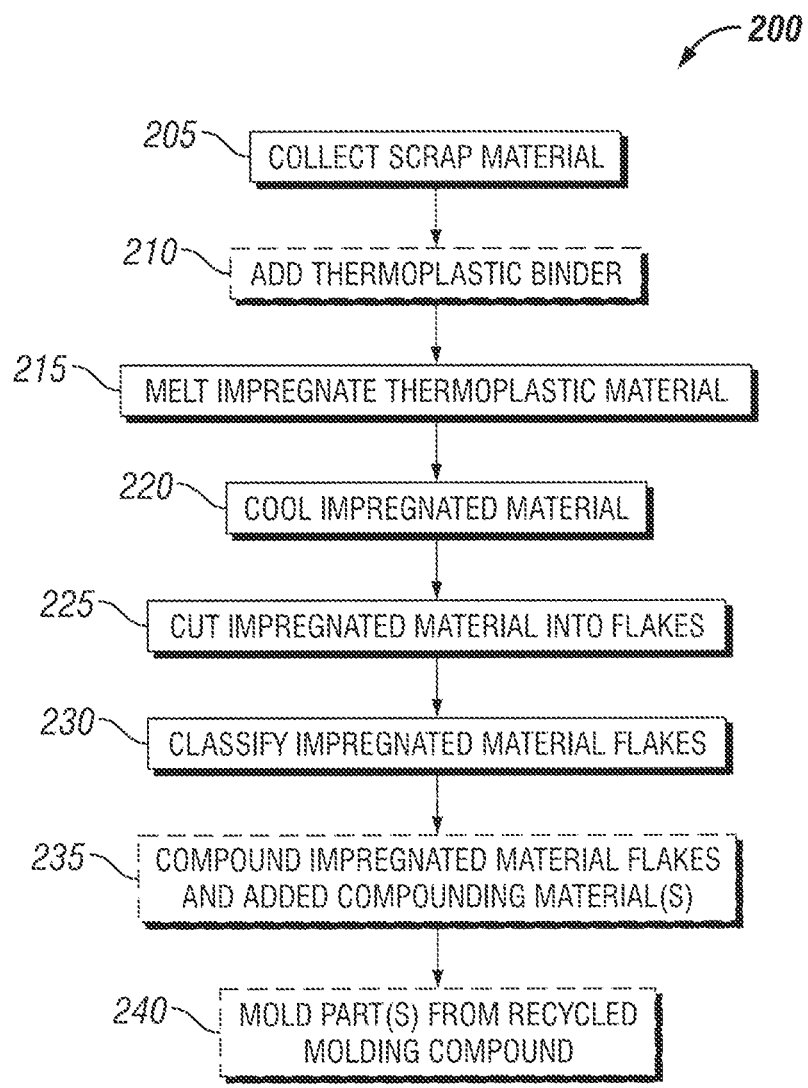
FIG. 2 is a flow chart illustrating an example method for recycling scrap broad goods having thermoplastic stabilizer materials.

FIG. 2 is a flow chart illustrating an example method 200 for recycling scrap broad goods having thermoplastic stabilizer materials, in accordance with the present application. In the example shown in FIG. 2, the method 200 begins with a first step 205, in which scrap material is collected. This step 205 may be carried out using any suitable apparatus, such as, for example, the accumulator 105 shown in FIG. 1. As noted above, in many cases, the starting scrap material may comprise any suitable broad goods or reinforcement materials with a thermoplastic material present to stabilize the tows, such as, for example, a carbon fiber fabric with a polyamide veil. In addition, the starting scrap material may comprise any suitable broad goods or reinforcement materials to which a thermoplastic or thermoset material could be added as a binder to facilitate the recycling process. In one specific example, the starting scrap material comprises a high strength aerospace grade material containing about 1-5 weight % thermoplastic as a tow-level stabilization agent.

Referring again to FIG. 2, in a next step 210, which is optional, thermoplastic is added to the scrap material as a binding agent, if desired. This step 210 may be carried out using any suitable method of substantially uniformly dispersing the thermoplastic binder onto the surface of the scrap material. For example, in some cases, the thermoplastic binder may comprise one or more powdered, liquid and/or film binders that can be added to the scrap material by sifting, curtain metering, spraying or otherwise substantially uniformly dispersing the binder(s) onto the surface of the scrap material.

In a next step 215, the thermoplastic is melt impregnated into the scrap material at the filament or fiber level. This step 215 may be carried out by heating and applying pressure to the scrap material for a selected period of time to force the thermoplastic into the scrap material and to stabilize the thermoplastic at the filament level. The heat may be applied using any suitable heating method, such as, for example, infrared, conduction or convection heating. The temperature and pressure selected to accomplish the impregnation of the thermoplastic may vary depending on a variety of factors, such as, for example: (a) the form of the thermoplastic (e.g., veil, scrim, powder, etc.); (b) the characteristics of the thermoplastic (e.g., melt temperature, viscosity, rheological behavior, etc.); and (c) the characteristics of the scrap material (e.g., tightness of the weave, etc.).

Generally, the temperature and pressure selected during the melt impregnation step 215 are chosen to be high enough that the viscosity of the thermoplastic is sufficiently reduced to allow the thermoplastic to flow into the fibers of the scrap material. In some cases, e.g., for polyamide binders, the selected temperature may fall within the range of about 350° F. to about 450° F., and the selected pressure may fall within the range of about 10 psi to about 100 psi. As one specific example, a carbon fiber fabric with a nylon veil may be heated to a temperature of about 400° F. at a pressure of about 10 psi for a period of about 10 seconds to achieve the desired melt impregnation. Those of ordinary skill in the art will know how to select an appropriate temperature and pressure, and an appropriate time period, based on the properties of the materials involved.

Referring again to FIG. 2, in a next step 220, the impregnated scrap material is cooled to a selected temperature, such as room temperature. In some cases, this cooling step 220 can be carried out by simply allowing the impregnated scrap material to rest until it reaches the desired temperature. In other cases, the cooling process can be accelerated with one or more fans and/or other suitable cooling systems or methods.

In a next step 225, the impregnated scrap material is cut into a plurality of particles or flakes. In some cases, this cutting step 225 can be carried out by slitting and chopping the impregnated scrap material using a rotary chopper or any other suitable cutting device or combination of devices.

In a next step 230, the flakes of impregnated scrap material are classified to remove larges or fines that do not fall within an acceptable range of variation from the desired flake size, as determined by the recycler. This classification step 230 can be carried out using a variety of systems and methods that are well-known to those of skill in the art. As a result, after the classification step 230, the remaining flakes are substantially uniform in size.

In a next step 235, which is optional, a compounding process may be performed, if desired, to create a recycled molding compound from the impregnated scrap material and one or more compounding materials. This compounding process can be carried out using any suitable apparatus, such as, for example, the extruder 160 shown in FIG. 1. In some cases, the recycled molding compound may comprise a thermoplastic molding compound, such as, for example, a recycled carbon fiber nylon molding compound. In a final step 240, which is also optional, one or more parts can be molded from the recycled molding compound using techniques that are well-known to those of skill in the art.

Example

Table 1, below, shows a comparison between a carbon fiber polyamide molding compound fabricated with a commercially available material (Column A) and a recycled carbon fiber material made using the systems and methods described in the present application (Column B). Both materials were nylon 6/12 reinforced with 30 weight % carbon fiber.

The commercially available material was RTP 285 D, manufactured by RTP Company of Winona, Minn. The following parameters of the molding compound made with RTP 285 D were measured by RTP Company and recorded in Column A of Table 1, below: tensile strength, tensile modulus, elongation, flexural strength, flexural modulus, notched impact, unnotched impact, specific gravity, volume resistivity, and surface resistivity.

The recycled carbon fiber material was fabricated by melt impregnating a nylon veil into the reinforcement fibers of a carbon fiber fabric at a temperature of about 400° F. and a pressure of about 85 psi for a period of about 30 minutes. The impregnated scrap material was then cut into flakes having a maximum dimension, or fiber length, of about ¼ inch square.

The flakes of impregnated scrap material were then compounded to form the recycled carbon fiber nylon molding compound. The same parameters of the recycled carbon fiber nylon molding compound were then measured by RTP Company and recorded in Column B of Table 1, below.

TABLE 1

|  | Column A (Commercial) | Column B (Recycled) |
|---|---|---|
| TENSILE STRENGTH, psi | 30,968 | 38,586 |
| TENSILE MODULUS, psi E6 | 2.67 | 2.84 |
| ELONGATION, % | 2.56 | 2.88 |
| FLEXURAL STRENGTH, psi | 47,479 | 56,436 |
| FLEXURAL MODULUS, psi E6 | 2.42 | 2.52 |
| NOTCHED IMPACT, ft lb/in | 1.94 | 3.03 |
| UNNOTCHED IMPACT, ft lb/in | 18.27 | 23.24 |
| SPECIFIC GRAVITY | 1.21 +/− 0.009 | 1.21 |
| VOLUME RESISTIVITY, ohms | 8.14E−01 | 3.39E+00 |
| SURFACE RESISTIVITY, ohms | 4.10E+03 | 1.00E+04 |

As demonstrated by the results recorded in Table 1, the recycled material is comparable or improved over the commercially available material with respect to each of the measured parameters. Accordingly, the systems and methods disclosed in the present application advantageously enable large scale recycling and re-use of scrap broad goods with a thermoplastic stabilizer material.

Previously, the presence of a thermoplastic veil or scrim to reinforce a material at the tow level was thought to interfere with recycling efforts, because the thermoplastic was difficult to remove mechanically. Using the systems and methods of the present application, however, no attempt is made to remove the thermoplastic as part of the recycling process. To the contrary, the thermoplastic is heated and pressed between the reinforcement fibers of the scrap material to bind the reinforcement fibers on the filament level, rather than at the tow level. When dry fibers are recycled, thermoplastic can be added to the fibers, then heated and pressurized to form the impregnated material. The impregnated material can then be cut into relatively small flakes or seeds that can be used as a feed material to produce new compounded components.

Figure 3:
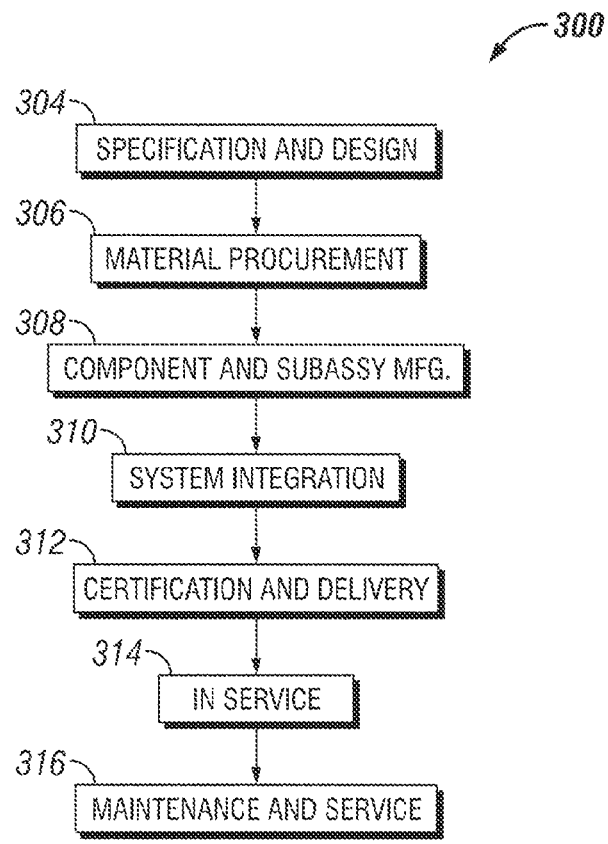
FIG. 3 is an illustration of a flow diagram of an aircraft production and service methodology.
Figure 4:
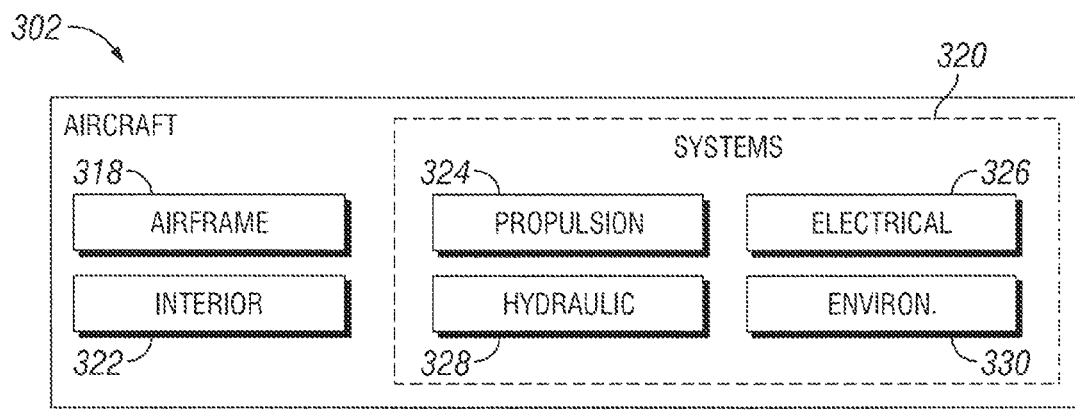
FIG. 4 is an illustration of a block diagram of an aircraft.

Referring to FIGS. 3-4, the systems and methods of the present application may be implemented in the context of an aircraft manufacturing and service method 300 as shown in FIG. 3 and an aircraft 302 as shown in FIG. 7. During preproduction, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:

1. A method for recycling broad goods material into a flaked feed material, the broad goods material including reinforcement fibers and thermoplastic material, the method comprising:
    applying heat and pressure to the broad goods material to impregnate the reinforcement fibers at a filament level with the thermoplastic material to form an impregnated fiber material;
    cooling the impregnated fiber material;
    cutting the cooled impregnated fiber material into flakes to produce the flaked feed material; and
    mixing the flaked feed material with a thermoset resin to create a bulk molding compound.

2. The method of claim 1 wherein the broad goods material comprises a fiber-reinforced resin-matrix composite material.

3. The method of claim 1 wherein impregnating the reinforcement fibers at a filament level comprises embedding the thermoplastic material between filaments of the reinforcement fibers.

4. The method of claim 1 further comprising adding the thermoplastic material to dry fibers.

5. The method of claim 1 wherein applying heat comprises heating by infrared, conduction or convection heating.

6. The method of claim 1 wherein applying heat and pressure comprises first applying heat and then applying pressure.

7. The method of claim 1 further comprising classifying the flakes to create substantially uniform flaked feed material output.

8. The method of claim 1 wherein cutting the cooled impregnated fiber material comprises slitting or chopping.

9. The method of claim 1 further comprising compounding the flaked feed material to create a thermoplastic or thermoset molding compound.

10. The method of claim 1 further comprising:
    sprinkling the flaked feed material onto a moving doctored resin film on a carrier; and impregnating the flaked feed material into the doctored resin film by application of heat and pressure, to create a sheet molding compound.

\* \* \* \* \*